US012559002B2

(12) United States Patent
Wei et al.

(10) Patent No.: US 12,559,002 B2
(45) Date of Patent: Feb. 24, 2026

(54) LATCH CONNECTOR

(71) Applicant: Wuxi Lee-Care Child Product Co., Ltd., Jiangsu (CN)

(72) Inventors: Chenlong Wei, Jiangsu (CN); Fei Li, Jiangsu (CN)

(73) Assignee: Wuxi Lee-Care Child Product Co., Ltd., Wuxi (CN)

( * ) Notice: Subject to any disclaimer, the term of this patent is extended or adjusted under 35 U.S.C. 154(b) by 323 days.

(21) Appl. No.: 18/244,293

(22) Filed: Sep. 10, 2023

(65) Prior Publication Data

US 2024/0375563 A1 Nov. 14, 2024

(30) Foreign Application Priority Data

May 8, 2023 (CN) .......................... 202321079624.8

(51) Int. Cl.
B60N 2/28 (2006.01)
F16B 45/02 (2006.01)

(52) U.S. Cl.
CPC .......... B60N 2/2887 (2013.01); *F16B 45/029* (2021.05)

(58) Field of Classification Search
CPC .. B60N 2/2887; B60N 2/2821; B60N 2/2806; B60N 2/2863; F16B 45/029; F16B 45/035; F16B 45/023; F16B 45/024; F16B 45/026; F16B 45/034; B60R 22/26; A44B 11/2523; A44B 11/26
USPC ...................................... 24/DIG. 52, DIG. 55
See application file for complete search history.

(56) References Cited

U.S. PATENT DOCUMENTS

| | | | | |
|---|---|---|---|---|
| 5,487,588 A * | 1/1996 | Burleigh | ................ | B60N 2/286 297/250.1 |
| 6,363,589 B1 * | 4/2002 | Calloway | .............. | F16B 45/026 24/600.1 |
| 6,962,394 B2 * | 11/2005 | Anthony | .............. | B60N 2/2887 297/250.1 |
| 7,837,275 B2 * | 11/2010 | Woellert | .............. | B60R 22/105 297/475 |
| 7,918,001 B2 * | 4/2011 | Buckingham | ........ | B60N 2/2863 24/599.3 |
| D649,432 S * | 11/2011 | Main | .............................. | D8/331 |
| D649,433 S * | 11/2011 | Buckingham | .................. | D8/331 |
| 9,873,358 B2 * | 1/2018 | Zhang | .................... | B60N 2/929 |
| 2004/0208692 A1 * | 10/2004 | Anthony | .............. | F16B 45/026 403/327 |
| 2007/0262636 A1 * | 11/2007 | Gastaldi | .............. | B60N 2/2887 297/463.1 |

(Continued)

*Primary Examiner* — Jason W San
*Assistant Examiner* — Rowland Do

(57) ABSTRACT

A latch connector includes a rotating piece linked to an unlocking assembly, which is provided with an unlocking button, an unlocking insert and green display parts; the unlocking insert is inserted into a front portion of the unlocking button, and button parts and the green display parts are disposed in a rear portion of the unlocking button; and a first latch hook which bends inwards with the rotation of the rotating piece is disposed on a front portion of the rotating piece, and a second latch hook which is in contact with the unlocking insert is disposed on a rear portion of the rotating piece. The latch connector can be installed smoothly and rapidly, and can be locked and unlocked quickly; and the state of the latch connector can be displayed more visually, and the safety in use is guaranteed.

10 Claims, 11 Drawing Sheets

(56) References Cited

U.S. PATENT DOCUMENTS

| | | | |
|---|---|---|---|
| 2009/0243310 A1* | 10/2009 | Buckingham ......... | F16B 45/008 |
| | | | 292/215 |
| 2010/0013282 A1* | 1/2010 | Balensiefer .......... | B60N 2/2887 |
| | | | 297/253 |
| 2010/0247230 A1* | 9/2010 | Buckingham ........... | B60R 22/26 |
| | | | 403/16 |
| 2011/0243653 A1* | 10/2011 | Buckingham ......... | F16B 45/029 |
| | | | 403/322.4 |
| 2013/0307305 A1* | 11/2013 | Guo ..................... | B60N 2/2821 |
| | | | 297/256.16 |
| 2014/0375094 A1* | 12/2014 | Xu ........................ | F16B 45/045 |
| | | | 297/250.1 |
| 2020/0269732 A1* | 8/2020 | Bendjellal ............ | B60N 2/2869 |

* cited by examiner 322          510

510

520

500

LATCH CONNECTOR

CROSS REFERENCE TO RELATED APPLICATIONS

The present application claims the benefit of Chinese Patent Application No. 202321079624.8 filed on May 8, 2023, the contents of which are incorporated herein by reference in their entirety.

BACKGROUND OF THE INVENTION

1. Technical Field

The invention relates to the technical field of safety seats, in particular to a LATCH connector.

2. Description of Related Art

Child safety seats are installed on car seats to allow infants to sit thereon and can fulfill a restraining effect to guarantee the safety of infants in case of an accident, so as to effectively reduce casualties caused by the accident. Different child safety seats are installed in different ways, and are generally connected to car seats through LATCH interfaces or ISOFIX interfaces.

When the child safety seat is installed through a LATCH interface, a LATCH connector of the child safety seat is locked in an interface of the car, and is then aligned and clamped in the interface. The assembly structure of LATCH connectors on the present market is complex, so the assembly and operation difficulty are greatly increased, the assembly efficiency is low, and assembly errors are likely to be caused, affecting safety use of the LATCH connectors.

BRIEF SUMMARY OF THE INVENTION

The technical issue to be settled by the invention is to provide a LATCH connector which is simple in assembly structure and high in assembly efficiency, and facilitates the installation of assemblies; the whole the whole installation process is smooth and can be completed quickly, reliable connection is guaranteed, and quick locking and unlocking of the LATCH connector are realized; and the two sides of the LATCH connector turn green when the LATCH connector is locked, and turn red when the LATCH connector is unlocked, so the state of the LATCH connector can be displayed more visually, and the safety in use is guaranteed.

To settle the above technical issue, one technical solution adopted by the invention is as follows: a LATCH connector comprises a housing, a stand, an unlocking assembly, and a rotating piece, wherein:

the housing is configured to accommodate and assemble the stand, the unlocking assembly and the rotating piece, the stand is configured to accommodate and assemble the unlocking assembly and the rotating piece, and the rotating piece is configured to be linked to the unlocking assembly;

the stand is provided with a base plate, wherein two side of the base plate on a front portion of the stand are bent to form a C-shaped cavity for accommodating the rotating piece, the base plate in a middle of the stand is flat, the unlocking assembly is disposed on the flat base plate in the middle of the stand, the base plate on a rear portion of the stand is widened towards two sides to form an external connection part, and the front portion of the stand, the middle of the stand and the rear portion of the stand are formed integrally; the stand is simple in structure and easy to machine, and facilitates the installation of the unlocking button and the rotating piece;

the unlocking assembly is provided with an unlocking button, an unlocking insert and green display parts, wherein a recess is formed in a front portion of the unlocking button to allow the unlocking insert to be inserted therein freely, button parts are disposed in a rear portion of the unlocking button, and mounting grooves are formed in side faces close to the button parts to allow the green display parts to be installed therein;

the rotating piece is able to rotate, a first latch hook is disposed on a front portion of the rotating piece and is able to bend inwards with the rotation of the rotating piece, and a second latch hook is disposed on a rear portion of the rotating piece and is able to contact the unlocking insert.

In a preferred embodiment of the invention, the rotating piece and the unlocking button are detachably assembled on the stand.

In a preferred embodiment of the invention, a first mounting hole and a second mounting hole are formed in the bent base plate on the front portion of the stand; a rotating piece mounting hole corresponding to the first mounting hole is formed in the rotating piece, and the rotating piece is assembled on the stand in a riveted manner through the rotating piece mounting hole, the first mounting hole and a rivet; an unlocking button mounting hole matched with the second mounting hole is formed in the front portion of the unlocking button, and the unlocking button is assembled on the stand in a riveted manner through the unlocking button mounting hole, the second mounting hole and a rivet; and the structure is novel, operation is easy, the whole installation process is smooth and can be completed quickly, the operating environment is user-friendly, the assembly efficiency is high, and reliable connection of the rotating piece and the unlocking button is guaranteed.

In a preferred embodiment of the invention, the bent base plate on the front portion of the stand has an end provided with a U-shaped opening, as well as an end provided with a groove which is able to contact the unlocking insert.

In a preferred embodiment of the invention, the rotating piece is configured to be linked to the unlocking assembly through an elastic element.

In a preferred embodiment of the invention, the elastic element is a return spring, and the rotating piece is connected to the unlocking button through the return spring; a first hook hole is formed in the rotating piece, a second hook hole is formed in the front portion of the unlocking button, and the return spring has an end connected into the first hook hole of the rotating piece, as well as an end connected into the second hook hole of the unlocking button; and the return spring is simple in structure and flexible to install, and can realize quick locking and unlocking of the LATCH connector.

In a preferred embodiment of the invention, the unlocking insert has a first end and a second end opposite to the first end, the first end of the unlocking insert is able to synchronously contact the second latch hook on the rear portion of the rotating piece and the groove in the stand, and the second end of the unlocking insert is connected into the recess of the unlocking button.

In a preferred embodiment of the invention, the second latch hook of the rotating piece has an arc surface and a locking position; when the LATCH connector is locked, the first end of the unlocking insert fully contacts the groove in the stand and also contacts the locking position of the second latch hook; when the LATCH connector is unlocked, the first end of the unlocking insert synchronously contacts the groove in the stand and the arc surface of the second latch hook; and the unlocking insert 500 can be synchronously matched with the groove of the stand and the second latch hook of the rotating piece to ensure that the unlocking insert can move more smoothly and be forced more uniformly, such that the LATCH connector can be locked more stably and firmly.

In a preferred embodiment of the invention, the housing is assembled on the stand in a plug-in manner, a large opening corresponding to the U-shaped opening in the stand is formed in a front portion of the housing, a C-shaped opening corresponding to the button parts of the unlocking button is formed in a rear portion of the housing to allow the button parts to be exposed, a display window is disposed each of two sides of the rear portion of the housing, and the display windows correspond and match the green display parts in shape.

In a preferred embodiment of the invention, the unlocking button is a red unlocking button; when the LATCH connector is locked, the display windows on the two sides turn green; and when the LATCH connector is unlocked, the display windows on two sides turn red.

The invention has the following beneficial effects: the assembly structure is simple, the assembly efficiency is high, the integrally formed stand is simple in structure and easy to machine and facilitates the installation of assemblies, operation is easy, the whole the whole installation process is smooth and can be completed quickly, the operating environment is user-friendly, reliable connection is guaranteed, and quick locking and unlocking of the LATCH connector are realized; the two sides of the LATCH connector turn green when the LATCH connector is locked, and turn red when the LATCH connector is unlocked, so the state of the LATCH connector can be displayed more visually, and the safety in use is guaranteed.

BRIEF DESCRIPTION OF THE SEVERAL VIEWS OF THE DRAWINGS

To more clearly describe the technical solutions of the embodiments of the invention, drawings used for describing the embodiments of the invention will be briefly introduced below. Obviously, the drawings in the following description merely illustrate some embodiments of the invention, and those ordinarily skilled in the art can obtain other drawings according to the following ones without creative labor, wherein.

REFERENCE SIGNS OF COMPONENTS IN THE FIGURES

Figure 1:
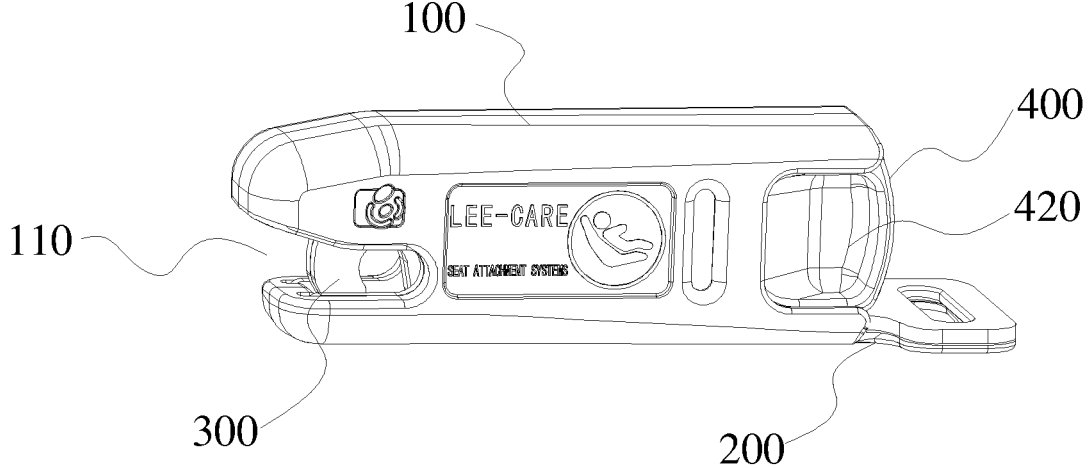
FIG. 1 is an external structural view of a LATCH connector in a locked state according to the invention.

100, housing; 110, large opening; 120, C-shaped opening; 130, display window; 200, stand; 210, base plate; 220, C-shaped cavity; 230, flat base plate; 240, external connection part; 250, first mounting hole; 260, second mounting hole; 270, U-shaped opening; 280, groove; 300, rotating piece; 310, first latch hook; 320, second latch hook; 321, arc surface; 322, locking position; 330, rotating piece mounting hole; 340, first hook hole; 400, unlocking button; 410, recess; 420, button part; 430, mounting groove; 440, unlocking button mounting hole; 450, second hook hole; 500, unlocking insert; 510, first end; 520, second end; 600, green display part; 700, rivet; 800, return spring.

DETAILED DESCRIPTION OF THE INVENTION

To gain a better understanding of the purposes, technical solutions and advantages of the embodiments of the invention, the technical solutions of the embodiments of the invention will be clearly and completely described below in conjunction with the drawings of these embodiments. Obviously, the embodiments in the following description are merely illustrative ones, and are not all possible ones of the invention. Generally, the components of the invention described and illustrated in the drawings may be arranged and designed according to different configurations.

Therefore, the detailed description of the embodiments of the invention provided below with reference to the drawings is not intended to limit the protection scope of the invention, and merely involves some selected embodiments of the invention. All other embodiments obtained by those ordinarily skilled in the art based on the following ones without creative labor should also fall within the protection scope of the invention.

It should be noted that similar numbers and alphabets in the following drawings represent similar items, so once one item is defined in one drawing, it will not be further defined or explained anymore in subsequent drawings.

In the description of the invention, it should be noted that terms such as "front" and "rear" are used to indicate directional or positional relationships based on the accompanying drawings, or indicate directional or positional relationships when the product of the invention is often placed in use merely for the purpose of facilitating and simplifying the description of the invention, and do not indicate or imply that devices or elements referred to must be in a specific direction, or be configured and operated in a specific direction, and thus, they should not be construed as limitations of the invention. In addition, terms such as "first" and "second" are merely for distinguishing different components in the description, and should not be construed as indicating or implying relative importance.

In the description of the invention, it should also be noted that unless otherwise expressly stated and defined, terms such as "dispose" and "connect" should be broadly understood. For example, "connect" may refer to fixed connection, detachable connection or integrated connection, or mechanical connection or electrical connection, or direct connection or indirect connection through an intermediate medium, or internal connection of two elements. Those ordinarily skilled in the art can understand the specific meanings of these terms in the invention as the case may be.

Figure 2:
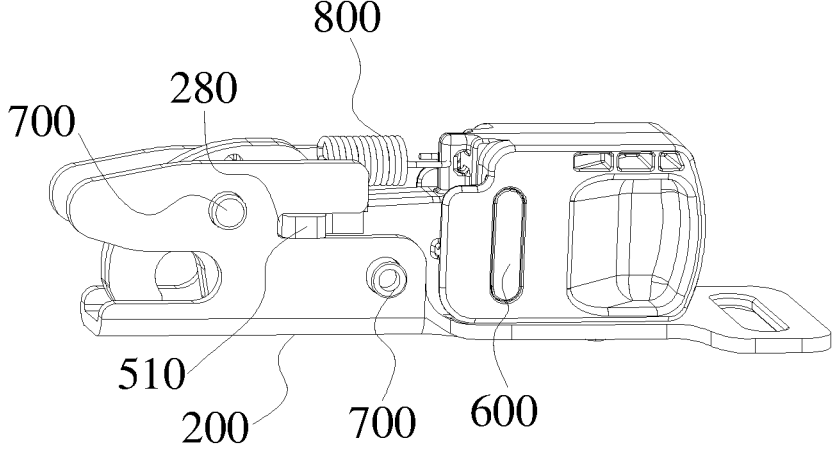
FIG. 2 is an internal structural view of the LATCH connector in the locked state according to the invention.
Figure 3:
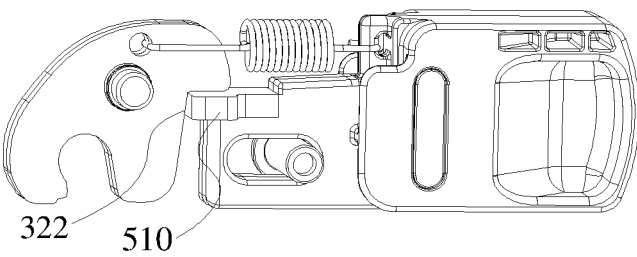
FIG. 3 is a structural view of an unlocking insert and a second latch hook which are in contact with each other when the LATCH connector is in the locked state according to the invention.
Figure 4:
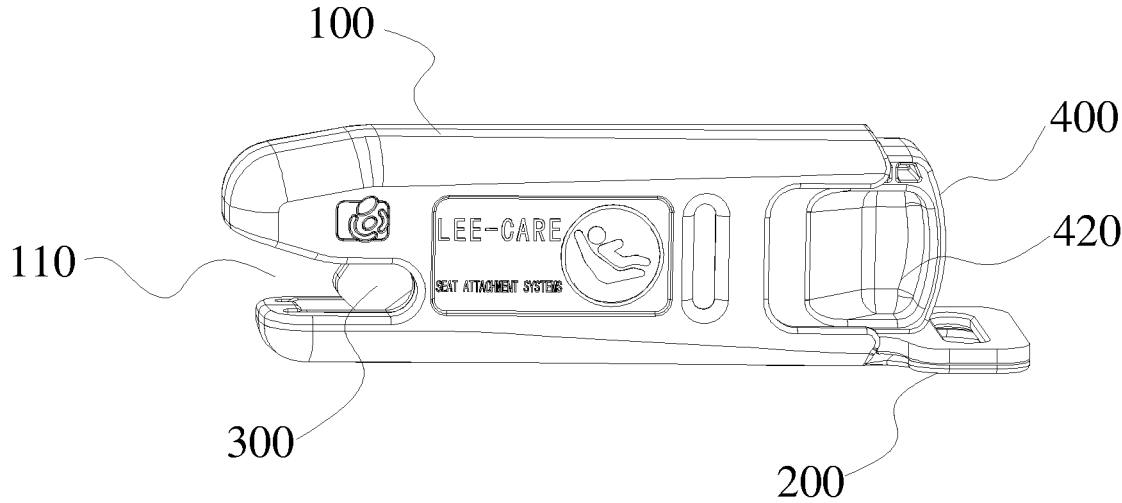
FIG. 4 is an external structural view of the LATCH connector in an unlocked state according to the invention.
Figure 5:
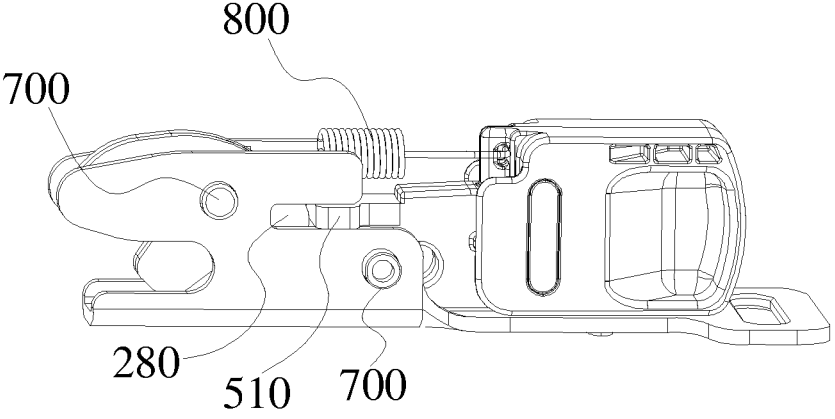
FIG. 5 is an internal structural view of the LATCH connector in the unlocked state according to the invention.
Figure 6:
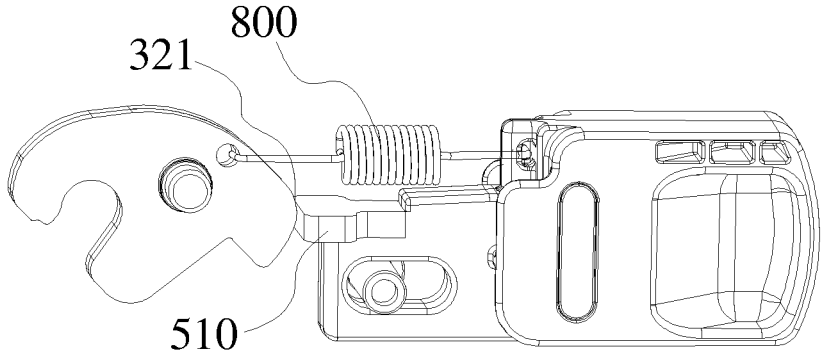
FIG. 6 is a structural view of the unlocking insert and the second latch hook which are in contact with each other when the LATCH connector in the unlocked state according to the invention.
Figure 7:
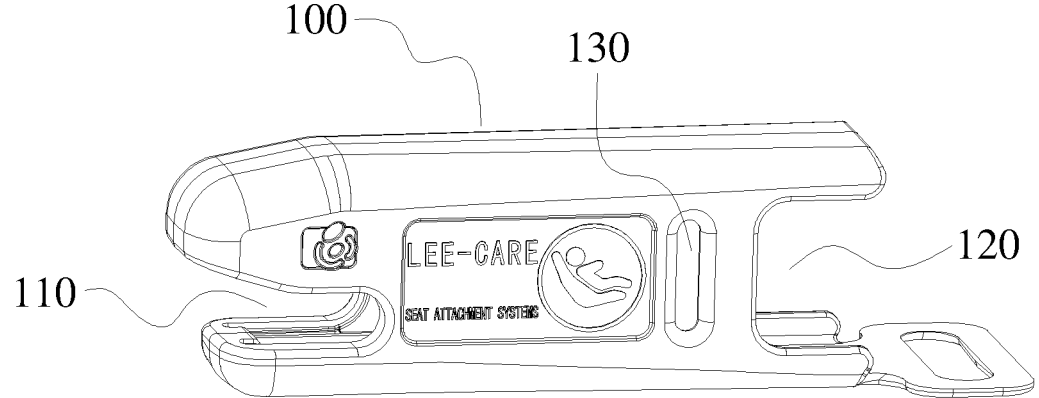
FIG. 7 is a structural view of a preferred embodiment of a housing of the LATCH connector according to the invention.
Figure 8:
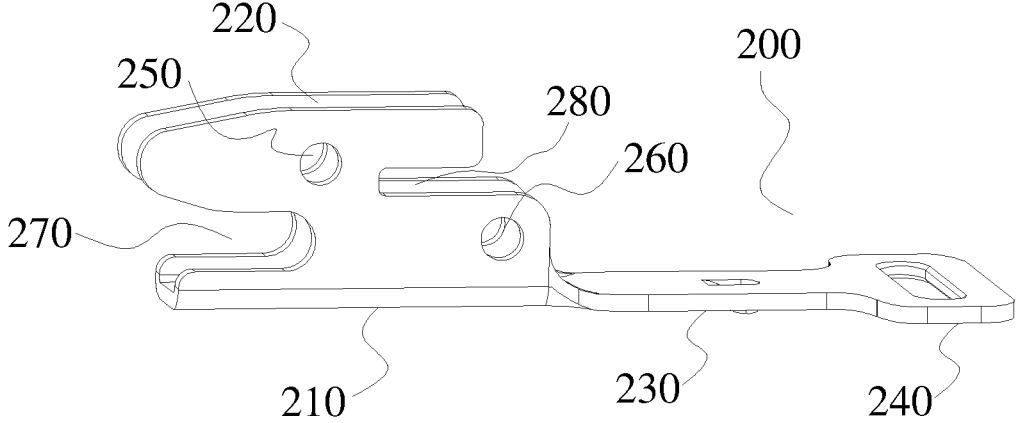
FIG. 8 is a structural diagram of a preferred embodiment of a stand of the LATCH connector according to the invention.
Figure 9:
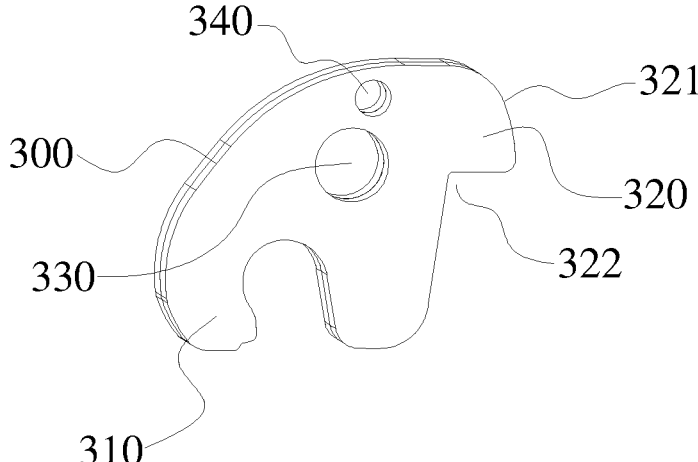
FIG. 9 is a structural diagram of a preferred embodiment of a rotating piece of the LATCH connector according to the invention.
Figure 10:
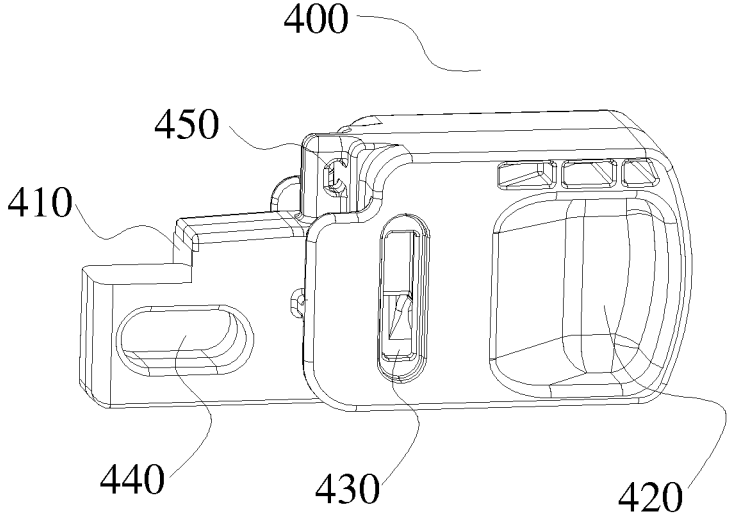
FIG. 10 is a structural diagram of a preferred embodiment of an unlocking button of the LATCH connector according to the invention.
Figure 11:
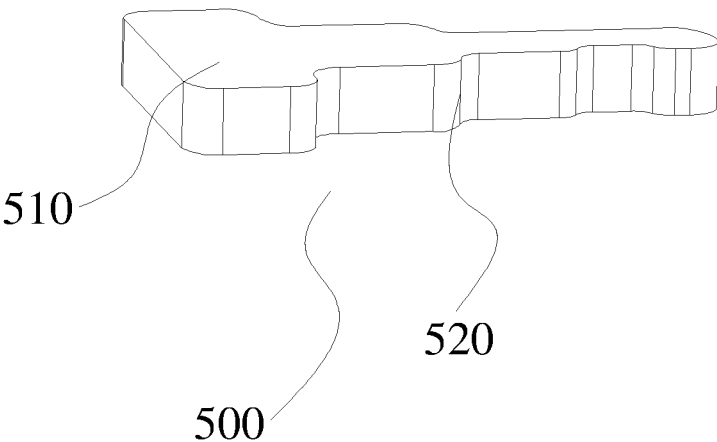
FIG. 11 is a structural diagram of a preferred embodiment of the unlocking insert of the LATCH connector according to the invention.

In the invention, unless otherwise expressly stated and defined, when a first feature is located above or below a second feature, the first feature may be in direct contact with the second feature, or the first feature may be in contact with the second feature through another feature therebetween rather than being in direct contact with the second feature. In addition, when a first feature is located on or above a second feature, the first feature may be exactly or obliquely above the second feature, or it merely indicates that the first feature is higher than the second feature. When a first feature is located below or under a second feature, the first feature may be exactly or obliquely below the second feature, or it merely indicates that the first feature is lower than the second feature FIG. 1-FIG. 11 illustrate some embodiments of the invention:

Embodiment 1

This embodiment relates to a LATCH connector, which comprises a housing 100, a stand 200, an unlocking assembly and a rotating piece 300, wherein the housing 100 is configured to accommodate and assemble the stand 200, the unlocking assembly and the rotating piece 300, the stand 200 is configured to accommodate and assemble the unlocking assembly and the rotating piece 300, and the rotating piece 300 is configured to be linked to the unlocking assembly to lock or unlock the LATCH connector.

The stand 200 is provided with a base plate 210, wherein two sides of the base plate on a front portion of the stand are bent to form a C-shaped cavity 220 for accommodating the rotating piece 300, the base plate in the middle of the stand is flat, the unlocking assembly is disposed on the flat base plate 230 in the middle of the stand, the base plate on a rear portion of the stand is widened towards two sides to form an external connection part 240, and the front portion of the stand, the middle of the stand and the rear portion of the stand are formed integrally.

Further, the unlocking assembly is provided with an unlocking button 400, an unlocking insert 500 and green display parts 600, wherein a recess 410 is formed in a front portion of the unlocking button 400 to allow the unlocking insert 500 to be inserted therein freely, button parts 420 are disposed on a rear portion of the unlocking button 400, and mounting grooves 430 are formed in side faces close to the button parts 420 to allow the green display parts 600 to be installed therein.

A U-shaped opening 270 is formed in one end of the bent base plate on the front portion of the stand 200, and a groove 280 which is able to contact the unlocking insert 500 is formed in the other end of the stand 200.

Further, the rotating piece 300 is able to rotate, a first latch hook 310 is disposed on a front portion of the rotating piece 300 and is able to bend inwards with the rotation of the rotating piece 300, and a second latch hook 320 is disposed on a rear portion of the rotating piece 300 and is able to contact the unlocking insert 500.

In this embodiment, the rotating piece 300 and the unlocking button 400 are detachably assembled on the stand 200. The integrally formed stand 200 is simple in structure and easy to machine, and facilitates the installation of the unlocking button 400 and the rotating piece 300.

In this embodiment, the rotating piece 300 is configured to be linked to the unlocking assembly through an elastic element to lock or unlock the LATCH connector.

Embodiment 2

This embodiment relates to a LATCH connector, which comprises a housing 100, a stand 200, an unlocking assembly and a rotating piece 300, wherein the housing 100 is configured to accommodate and assemble the stand 200, the unlocking assembly and the rotating piece 300, the stand 200 is configured to accommodate and assemble the unlocking assembly and the rotating piece 300, and the rotating piece 300 is configured to be linked to the unlocking assembly to lock or unlock the LATCH connector.

In this embodiment, the rotating piece 300 and the unlocking button 400 are installed on the stand 200 through in a riveted manner. This embodiment is identical with Embodiment 1 in other structures.

In this embodiment, a first mounting hole 250 and a second mounting hole 260 are formed in the bent base plate on the front portion of the stand 200, a rotating piece mounting hole 330 corresponding to the first mounting hole 250 is formed in the rotating piece 300, and the rotating piece 300 is assembled on the stand 200 in a riveted manner through the rotating piece mounting hole 330, the first mounting hole 250 and a rivet 700.

An unlocking button mounting hole 440 matched with the second mounting hole 260 is formed in the front portion of the unlocking button 400, and the unlocking button 400 is assembled on the stand in a riveted manner through the unlocking button mounting hole 440, the second mounting hole 260 and a rivet 700.

The riveted installation structure is novel, installation is easy, the whole installation process is smooth and can be completed quickly, the operating environment is user-friendly, the assembly efficiency is high, and reliable connection of the rotating piece and the unlocking button is guaranteed.

Embodiment 3

This embodiment relates to a LATCH connector, which comprises a housing 100, a stand 200, an unlocking assembly and a rotating piece 300, wherein the housing 100 is configured to accommodate and assemble the stand 200, the unlocking assembly and the rotating piece 300, the stand 200 is configured to accommodate and assemble the unlocking assembly and the rotating piece 300, and the rotating piece 300 is configured to be linked to the unlocking assembly to lock or unlock the LATCH connector.

In this embodiment, the rotating piece 300 is connected to the unlocking button 400 through a return spring 800. This embodiment is identical with Embodiment 2 in other structures.

In this embodiment, a first hook hole 340 is formed in the rotating piece 300, a second hook hole 450 is formed in the front portion of the unlocking button 400, one end of the return spring 800 is connected into the first hook hole 340 of the rotating piece 300, and the other end of the return spring 800 is connected into the second hook hole 450 of the unlocking button 400.

The return spring 800 is simple in structure and flexible to install, and can realize quick locking and unlocking of the LATCH connector.

Embodiment 4

This embodiment relates to a LATCH connector, which comprises a housing 100, a stand 200, an unlocking assembly and a rotating piece 300, wherein the housing 100 is configured to accommodate and assemble the stand 200, the unlocking assembly and the rotating piece 300, the stand 200 is configured to accommodate and assemble the unlocking assembly and the rotating piece 300, and the rotating piece 300 is configured to be linked to the unlocking assembly to lock or unlock the LATCH connector.

This embodiment mainly discloses the specific structure of the unlocking insert 500 and the state of the unlocking insert 500 when the LATCH connector is locked and unlocked, and is identical with Embodiment 3 in other structures.

In this embodiment, the unlocking insert 500 has a first end 510 and a second end 520 opposite to the first end 510, the first end 510 of the unlocking insert 500 is able to synchronously contact the second latch hook 320 on the rear portion of the rotating piece 300 and the groove 280 in the stand 200, and the second end 520 of the unlocking insert 500 is connected into the recess 410 of the unlocking button 400.

The second latch hook 320 of the rotating piece 300 has an arc surface 321 and a locking position 322:

When the LATCH connector is locked, the first end 510 of the unlocking insert 500 fully contacts the groove 280 in the stand 200 and also contacts the locking position 322 of the second latch hook 320; when the LATCH connector is unlocked, the first end 510 of the unlocking insert 500 contacts the groove 280 in the stand 200 and also contacts the arc surface 321 of the second latch hook 320.

The unlocking insert 500 is synchronously matched with the groove 280 of the stand 200 and the second latch hook 320 of the rotating piece 300 to ensure that the unlocking insert 500 can move more smoothly and be forced more uniformly, such that the LATCH connector can be locked more stably and firmly.

Embodiment 5

This embodiment relates to a LATCH connector, which comprises a housing 100, a stand 200, an unlocking assembly and a rotating piece 300, wherein the housing 100 is configured to accommodate and assemble the stand 200, the unlocking assembly and the rotating piece 300, the stand 200 is configured to accommodate and assemble the unlocking assembly and the rotating piece 300, and the rotating piece 300 configured to be linked to the unlocking assembly to lock or unlock the LATCH connector.

This embodiment mainly discloses the structure of the housing 100, and is identical with Embodiment 4 in other structures.

In this embodiment, a large opening 110 corresponding to the U-shaped opening 270 in the stand is formed in a front portion of the housing 100, a C-shaped opening 120 corresponding to the button parts of the unlocking button is formed in a rear portion of the housing 100 to expose the button parts 420, a display window 130 is disposed on each of two sides of the rear portion of the housing 100, and the display windows 130 correspond and match the green display parts 600 in shape.

In this embodiment, the unlocking button 400 is typically a red unlocking button; when the LATCH connector is locked, the display windows 130 on the two sides turn green; and when the LATCH connector is unlocked, the display windows 130 on the two sides turn red.

The installation process of the LATCH connector in this embodiment is as follows:

a. The unlocking insert 500, the green display parts 600 and the unlocking button 400 are assembled together to form the unlocking assembly;

b. The rotating piece 300 and the return spring 800 are assembled together;

c. The unlocking assembly formed in Step a is installed in the stand 200, and the rivet 700 is punched into in the unlocking button mounting hole 400;

d. The rotating piece 300 and the return spring 800 are installed in the stand 200, the other end of the return spring 800 is connected to the unlocking button 400, and then the rivet 700 is installed in the rotating piece mounting hole 300; and e. The housing 100 and the assembly obtained in Step d are assembled together in a plug-in manner.

The locking and unlocking process of the LATCH connector in this embodiment is as follows:

When the LATCH connector needs to be locked, the LATCH connector is aligned with a LATCH interface, the rotating piece 300 is forced to rotate, the first latch hook 310 is forced to bend inwards, and the return spring 800 is pulled at the same time to pull the unlocking button 400 to move forward until the first end 510 of the unlocking insert 500 fully contacts the groove 280 in the stand 200 and also contacts the locking position 322 of the second latch hook 320, such that the LATCH connector is locked;

When the LATCH connector needs to be unlocked, users hold the button parts 420 on two sides of the rear portion of the unlocking button 400 and move them backward, so the unlocking button 400 moves backward synchronously, the unlocking insert 500 moves backward with the unlocking button 400, at the same time, the return spring 800 drives the rotating piece 300 to rotate backward, at this moment, the first end 510 of the unlocking insert 500 moves backward, and still contacts the groove 280 in the stand 200 and the arc surface 321 of the second latch hook 320.

The LATCH connector of the invention has the following beneficial effects:

The assembly structure is simple, the assembly efficiency is high, the integrally formed stand is simple in structure and easy to machine and facilitates the installation of assemblies, operation is easy, the whole the whole installation process is smooth and can be completed quickly, the operating environment is user-friendly, reliable connection is guaranteed, and quick locking and unlocking of the LATCH connector are realized; the two sides of the LATCH connector turn green when the LATCH connector is locked, and turn red when the LATCH connector is unlocked, so the state of the LATCH connector can be displayed more visually, and the safety in use is guaranteed.

The embodiments of the invention are illustrated above, but these embodiments are not used to limit the patent scope of the invention. All equivalent structures or equivalent flow transformations made according to the contents of the specification of the invention, or direct or indirect applications to other related technical fields should fall within the patent protection scope of the invention.

What is claimed is:

1. A latch connector, comprising a housing, a stand, an unlocking assembly and a rotating piece, wherein:

the housing is configured to accommodate and assemble the stand, the unlocking assembly and the rotating piece, the stand is configured to accommodate and assemble the unlocking assembly and the rotating piece, and the rotating piece is configured to be linked to the unlocking assembly;

the stand is provided with a base plate, wherein two sides of the base plate on a front portion of the stand are bent to form a C-shaped cavity for accommodating the rotating piece, the base plate in a middle of the stand is flat, the unlocking assembly is disposed on the flat base plate in the middle of the stand, the base plate on a rear portion of the stand is widened towards the two sides to form an external connection part, and the front portion of the stand, the middle of the stand and the rear portion of the stand are formed integrally;

the unlocking assembly is provided with an unlocking button, an unlocking insert and green display parts, wherein a recess is formed in a front portion of the unlocking button to allow the unlocking insert to be inserted therein freely, button parts are disposed in a rear portion of the unlocking button, and mounting grooves are formed in side faces close to the button parts to allow the green display parts to be installed therein;

the rotating piece is able to rotate, a first latch hook is disposed on a front portion of the rotating piece and is able to bend inwards with the rotation of the rotating piece, and a second latch hook is disposed on a rear portion of the rotating piece and is able to contact the unlocking insert;

wherein the rotating piece is configured to be linked to the unlocking assembly through an elastic element;

wherein the elastic element is a return spring, and the rotating piece is connected to the unlocking button through the return spring;

a first hook hole is formed in the rotating piece, a second hook hole is formed in the front portion of the unlocking button, and the return spring has an end connected into the first hook hole of the rotating piece, as well as an end connected into the second hook hole of the unlocking button.

2. The latch connector according to claim 1, wherein the rotating piece and the unlocking button are detachably assembled on the stand.

3. The latch connector according to claim 2, wherein a first mounting hole and a second mounting hole are formed in the bent base plate on the front portion of the stand;

a rotating piece mounting hole corresponding to the first mounting hole is formed in the rotating piece, and the rotating piece is assembled on the stand in a riveted manner through the rotating piece mounting hole, the first mounting hole and a rivet;

an unlocking button mounting hole matched with the second mounting hole is formed in the front portion of the unlocking button, and the unlocking button is assembled on the stand in a riveted manner through the unlocking button mounting hole, the second mounting hole and a rivet.

4. The latch connector according to claim 2, wherein the bent base plate on the front portion of the stand has an end provided with a U-shaped opening, as well as an end provided with a groove which is able to contact the unlocking insert.

5. The latch connector according to claim 4, wherein the unlocking insert has a first end and a second end opposite to the first end, the first end of the unlocking insert is able to synchronously contact the second latch hook on the rear portion of the rotating piece and the groove in the stand, and the second end of the unlocking insert is connected into the recess of the unlocking button.

6. The latch connector according to claim 5, wherein the second latch hook of the rotating piece has an arc surface and a locking position; when the latch connector is locked, the first end of the unlocking insert fully contacts the groove in the stand and also contacts the locking position of the second latch hook; and when the latch connector is unlocked, the first end of the unlocking insert synchronously contacts the groove in the stand and the arc surface of the second latch hook.

7. The latch connector according to claim 4, wherein the housing is assembled on the stand in a plug-in manner, a large opening corresponding to the U-shaped opening in the stand is formed in a front portion of the housing, a C-shaped opening corresponding to the button parts of the unlocking button is formed in a rear portion of the housing to allow the button parts to be exposed, a display window is disposed each of two sides of the rear portion of the housing, and the display windows correspond and match the green display parts in shape.

8. The latch connector according to claim 7, wherein the unlocking button is a red unlocking button; when the latch connector is locked, the display windows on the two sides turn green; and when the latch connector is unlocked, the display windows on the two sides turn red.

9. A latch connector, comprising a housing, a stand, an unlocking assembly and a rotating piece, wherein:

the housing is configured to accommodate and assemble the stand, the unlocking assembly and the rotating piece, the stand is configured to accommodate and assemble the unlocking assembly and the rotating piece, and the rotating piece is configured to be linked to the unlocking assembly;

the stand is provided with a base plate, wherein two sides of the base plate on a front portion of the stand are bent to form a C-shaped cavity for accommodating the rotating piece, the base plate in a middle of the stand is flat, the unlocking assembly is disposed on the flat base plate in the middle of the stand, the base plate on a rear portion of the stand is widened towards the two sides to form an external connection part, and the front portion of the stand, the middle of the stand and the rear portion of the stand are formed integrally;

the unlocking assembly is provided with an unlocking button, an unlocking insert and green display parts, wherein a recess is formed in a front portion of the unlocking button to allow the unlocking insert to be inserted therein freely, button parts are disposed in a rear portion of the unlocking button, and mounting grooves are formed in side faces close to the button parts to allow the green display parts to be installed therein;

the rotating piece is able to rotate, a first latch hook is disposed on a front portion of the rotating piece and is able to bend inwards with the rotation of the rotating piece, and a second latch hook is disposed on a rear portion of the rotating piece and is able to contact the unlocking insert;

wherein the rotating piece and the unlocking button are detachably assembled on the stand;

wherein the bent base plate on the front portion of the stand has an end provided with a U-shaped opening, as well as an end provided with a groove which is able to contact the unlocking insert;

wherein the unlocking insert has a first end and a second end opposite to the first end, the first end of the unlocking insert is able to synchronously contact the second latch hook on the rear portion of the rotating piece and the groove in the stand, and the second end of the unlocking insert is connected into the recess of the unlocking button.

10. A latch connector, comprising a housing, a stand, an unlocking assembly and a rotating piece, wherein:

the housing is configured to accommodate and assemble the stand, the unlocking assembly and the rotating piece, the stand is configured to accommodate and assemble the unlocking assembly and the rotating piece, and the rotating piece is configured to be linked to the unlocking assembly;

the stand is provided with a base plate, wherein two sides of the base plate on a front portion of the stand are bent to form a C-shaped cavity for accommodating the rotating piece, the base plate in a middle of the stand is flat, the unlocking assembly is disposed on the flat base plate in the middle of the stand, the base plate on a rear portion of the stand is widened towards the two sides to form an external connection part, and the front portion of the stand, the middle of the stand and the rear portion of the stand are formed integrally;

the unlocking assembly is provided with an unlocking button, an unlocking insert and green display parts, wherein a recess is formed in a front portion of the unlocking button to allow the unlocking insert to be inserted therein freely, button parts are disposed in a rear portion of the unlocking button, and mounting grooves are formed in side faces close to the button parts to allow the green display parts to be installed therein;

the rotating piece is able to rotate, a first latch hook is disposed on a front portion of the rotating piece and is able to bend inwards with the rotation of the rotating piece, and a second latch hook is disposed on a rear portion of the rotating piece and is able to contact the unlocking insert;

wherein the rotating piece and the unlocking button are detachably assembled on the stand;

wherein the bent base plate on the front portion of the stand has an end provided with a U-shaped opening, as well as an end provided with a groove which is able to contact the unlocking insert;

wherein the housing is assembled on the stand in a plug-in manner, a large opening corresponding to the U-shaped opening in the stand is formed in a front portion of the housing, a C-shaped opening corresponding to the button parts of the unlocking button is formed in a rear portion of the housing to allow the button parts to be exposed, a display window is disposed each of two sides of the rear portion of the housing, and the display windows correspond and match the green display parts in shape.

* * * * *